2,991,152
METHOD OF PREPARING SODIUM AND POTASSIUM HYPOSULPHITE

Dieter Goerrig, Lohmar (Siegkreis), Germany (Farbenfabriken Bayer A.G., Leverkusen, Germany), and Friedrich Schubert, Leverkusen, Germany; said Schubert assignor to said Goerrig
No Drawing. Filed Jan. 13, 1958, Ser. No. 708,402
Claims priority, application Germany Jan. 16, 1957
4 Claims. (Cl. 23—116)

It is known that free hyposulphurous acid, $H_2S_2O_4$, is very unstable. A salt $(CoSO_2)$, has been isolated therefrom, but this salt has no practical value. On the other hand, two derivatives thereof are of considerable technical interest.

By combining the hyposulphurous acid with sulphurous acid and forming an alkali salt, sodium dithionite $(Na_2S_2O_4)$ is formed, which is used under the name of "hyposulphite" or "hydrosulphite" as a valuable reducing agent.

Solutions which contain the free hyposulphurous acid or the salts or derivatives thereof, such as $Na_2S_2O_4$, can be reacted with formaldehyde to yield quite a stable compound (oxymethane sulphinic acid) which is also used as its sodium salt, for example under the name "Rongalit" ®, as a valuable reducing agent.

In the production of such derivatives of hyposulphurous acid, a distinction should therefore be made between the step of the reduction of the sulphurous acid or its salts, which yields the free hyposulphurous acid or its salts, and the further step which converts the solutions of unstable substances which are first formed into substances which are stable when stored.

In the known processes, the reduction of the sulphurous acid or derivatives thereof is effected by means of metals; zinc, zinc amalgam and sodium amalgam have for example been proposed for this purpose. Characteristic of such reactions is the transition $$Me^{(II)} \rightarrow Me^{++} + 2\ominus$$

which can only take place on the surface of the metals and which yields the electrons for the reaction (in the ideal case)

$$SO_2 + 2\ominus \rightarrow SO_2^=$$

Accordingly, such a reaction does not take place suddenly, but requires a long time, and in particular care must be taken that the dissolution of the metal does not take place more quickly than sulphurous acid or its derivatives can migrate to the metal surface, since otherwise useless evolution of hydrogen is initiated, this causing a loss of the reducing agent.

The present invention is concerned with a process for the production of derivatives of hyposulphurous acid by reduction of sulphur dioxide or its derivatives, the process consisting in that the reduction is carried out with a borohydride.

The process of the invention therefore uses not metals, but solutions in which the reducing agent is present as an ion, and in fact as an anion. It is preferred to use a water-soluble salt of hydroboric acid, for example $NaBH_4$, $KBH_4$ or $Ca(BH_4)_2$. The solutions thereof react within the sulphurous acid or its salts or other derivatives in a substantially quantitative manner. It has been found that when solutions are mixed by pouring them together in a ratio such as is required by the following equation $$NaBH_4 + 8NaHSO_3 \rightarrow NaBO_2 + 6H_2O + 4Na_2S_2O_4$$

the reaction in accordance with the foregoing equation is complete after one minute at 20° C.

The examples show in a number of individual cases how the reaction can be carried out. The conditions can be varied within very wide limits. For example, it is not of decisive importance in the process of the invention whether gaseous $SO_2$ or a sulphurous acid ester is introduced into an alcoholic solution containing $NaBH_4$ and $NaOH$, or whether solid $LiBH_4$ is introduced into an aqueous calcium bisulphite solution.

It is a characteristic feature of the invention that $SO_2$ or derivatives of $SO_2$ which are at the oxidation stage of $SO_2$ are reacted with borohydrides, all or some of the sulphur changing into the oxidation stage of hyposulphurous acid.

Further working up of the reduced solution, for example the isolation of the $Na_2S_2O_4$ or of the $$OH.CH_2.SO_2Na$$

can be carried out if desired, but it is possible for the reduction solution to be used directly.

The invention is further illustrated by the following example without being restricted thereto.

Example 150 l. of a $NaHSO_3$ solution containing 81 kg. of $NaHSO_3$ were introduced into an open tube container and diulted with water up to about 400 l. A solution of 5.28 kg. of $KBH_4$ in about 100 l. of water are run in with stirring in the course of 15 minutes, a slight evolution of gas being observed. The temperature of the combined solution rose to 23° C., while the individual solutions had a temperature of only 8° C. After the solutions were thoroughly mixed, 10 l. of caustic soda solution (32° Bé.) were added and the total liquid was made up to 600 l.

The solution was used in the dyeing of various vat dyestuffs on the jig in the course of 28 hours, instead of concentrated hydrosulphite.

It was determined that the introduction into the jig liquor of 9.25 l. of the solution after 1 hour,
9.10 l. of the solution after 3 hours,
9.10 l. of the solution after 6 hours,
9.05 l. of the solution after 9 hours,
9.25 l. of the solution after 22 hours,
9.30 l. of the solution after 28 hours, brought about the same $Na_2S_2O_4$ concentration as the dissolution of 1.00 kg. of hydrosulphite conc. containing 92.7% of $Na_2S_2O_4$ in the same jig liquor.

In the temporal mean value of 28 hours, the above solution had a concentration of 100 kg. of pure $Na_2S_2O_4/l$, i.e. the solution contained 60 kg. of $Na_2S_2O_4$, which led to a chemical yield of the reaction.

$$KBH_4 + 8NaHSO_3 \rightarrow 4Na_2S_2O_4 + 6H_2O + KBO_2$$

of about 90.7% of the theoretical.

The dyeings were carried out with 9.20 l. of the above solution or 0.081 kg. of $KBH_4$
1.24 kg. of $NaHSO_3$ instead of 1 kg. of hydrosulphite conc. The same results were obtained as if the dyeings were produced with the solid product.

We claim:
1. In a process for the production of sodium and potassium salts of hyposulphurous acid by the reduction of the $SO_2$-ion in aqueous solution, the step which comprises reducing the $SO_2$-ion by means of a borohydride which is a member selected from the group consisting of sodium and potassium borohydride.
2. In a process for the production of sodium and potassium salts of hyposulphurous acid by the reduction of the corresponding metal bisulphite in aqueous solution, the step which comprises reducing the said bisulphite by means of a borohydride which is a member selected from the group consisting of sodium and potassium borohydride.

3. In a process for the production of sodium hyposulphite by the reduction of sodium hydrogen sulphite in aqueous solution, the step which comprises reducing the sodium hydrogen sulphite by means of sodium borohydride.

4. In a process for the production of sodium hyposulphite by the reduction of sodium hydrogen sulphite in aqueous solution, the step which comprises mixing aqueous solutions of sodium hydrogen sulphite and sodium borohydride in the ratio required in accordance with the equation:

$$NaBH_4 + 8NaHSO_3 \rightarrow NaBO_2 + 6H_2O + 4Na_2S_2O_4$$

References Cited in the file of this patent

UNITED STATES PATENTS

| | | |
|---|---|---|
| 2,204,476 | Dorph | June 11, 1940 |
| 2,461,661 | Schlesinger et al. | Feb. 15, 1949 |
| 2,744,810 | Jackson | May 8, 1956 |

OTHER REFERENCES

Sodium Hydride, Bulletin 507A, Metal Hydrides Inc., 12–24 Congress St., Beverly, Mass. Received, dated Feb. 15, 1950, pages 1 and 2.

UNITED STATES PATENT OFFICE
CERTIFICATE OF CORRECTION

Patent No. 2,991,152                        July 4, 1961

Dieter Goerrig et al.

It is hereby certified that error appears in the above numbered patent requiring correction and that the said Letters Patent should read as corrected below.

In the heading to the printed specification, lines 4 and 5, strike out "(Farbenfabriken Bayer A.G., Leverkusen, Germany)".

Signed and sealed this 5th day of December 1961.

(SEAL)
Attest:

ERNEST W. SWIDER
Attesting Officer

DAVID L. LADD
Commissioner of Patents

USCOMM-DC